United States Patent
Copeland et al.

(10) Patent No.: US 11,780,704 B2
(45) Date of Patent: Oct. 10, 2023

(54) MEASUREMENT AND DIAGNOSTIC OF ELEVATOR DOOR PERFORMANCE USING SOUND AND VIDEO

(71) Applicant: OTIS ELEVATOR COMPANY, Farmington, CT (US)

(72) Inventors: George Scott Copeland, Wethersfield, CT (US); Pradeep Miriyala, Telangana (IN); Rachit Sahgal, Telangana (IN); Jinho Song, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 857 days.

(21) Appl. No.: 16/783,554

(22) Filed: Feb. 6, 2020

(65) Prior Publication Data

US 2021/0245995 A1    Aug. 12, 2021

(51) Int. Cl.
| | |
|---|---|
| *B66B 3/02* | (2006.01) |
| *G06T 7/73* | (2017.01) |
| *B66B 13/14* | (2006.01) |
| *B66B 13/26* | (2006.01) |

(52) U.S. Cl.
CPC ............ *B66B 3/023* (2013.01); *B66B 13/143* (2013.01); *B66B 13/26* (2013.01); *G06T 7/73* (2017.01); *G06T 2207/30232* (2013.01)

(58) Field of Classification Search
CPC ....... B66B 3/023; B66B 13/143; B66B 13/26; B66B 13/301; B66B 5/0037; B66B 5/0025; B66B 5/0031; B66B 5/02; G06T 7/73; G06T 2207/30232
See application file for complete search history.

(56) References Cited

U.S. PATENT DOCUMENTS

| | | |
|---|---|---|
| 6,854,565 B2 | 2/2005 | Peräläet et al. |
| 6,988,594 B2 | 1/2006 | Deplazes et al. |
| 7,423,398 B2 | 9/2008 | Tyni et al. |
| 7,637,355 B2 | 12/2009 | Tyni |
| 7,823,706 B2 | 11/2010 | Tyni et al. |
| 8,660,700 B2 | 2/2014 | Jia et al. |
| 9,469,503 B2 | 10/2016 | Bunter |
| 9,556,002 B2 | 1/2017 | Wilke et al. |
| 9,586,790 B2 | 3/2017 | Tyni et al. |

(Continued)

FOREIGN PATENT DOCUMENTS

| | | |
|---|---|---|
| CN | 103303758 A | 9/2013 |
| CN | 106163958 A | 11/2016 |

(Continued)

OTHER PUBLICATIONS

European Search Report for Application No. 20215776.4; dated Jun. 15, 2021; 6 Pages.

(Continued)

*Primary Examiner* — Jeffrey Donels
(74) *Attorney, Agent, or Firm* — CANTOR COLBURN LLP

(57) ABSTRACT

A component monitoring system for monitoring a component of a conveyance system including a conveyance apparatus including: a camera configured to capture a sequence images of the component, the sequence of images being motion data; and a processor configured to determine an evaluation summary of the component in response to at least the motion data.

17 Claims, 4 Drawing Sheets

(56) References Cited

U.S. PATENT DOCUMENTS

| | | | |
|---|---|---|---|
| 10,196,236 | B2 | 2/2019 | Sonnenmoser et al. |
| 10,494,230 | B2 | 12/2019 | Fragner |
| 10,547,917 | B2 | 1/2020 | Copeland et al. |
| 2018/0044134 | A1 | 2/2018 | Copeland et al. |
| 2018/0332368 | A1 | 11/2018 | Copekand et al. |
| 2018/0346284 | A1* | 12/2018 | Swami .................. B66B 5/027 |
| 2018/0346287 | A1* | 12/2018 | Fragner ................ B66B 25/006 |
| 2019/0193992 | A1 | 6/2019 | Studer et al. |
| 2020/0017333 | A1* | 1/2020 | Giese ................... B66B 5/0037 |
| 2020/0071125 | A1* | 3/2020 | Kuhn ................... B66B 1/3461 |

FOREIGN PATENT DOCUMENTS

| | | |
|---|---|---|
| CN | 110040595 A | 7/2019 |
| EP | 1556303 B1 | 6/2006 |
| JP | 2005041674 A | 2/2005 |
| JP | 5571726 B2 | 8/2014 |
| JP | 2015168560 A | 9/2015 |
| WO | 2010016827 A1 | 2/2010 |
| WO | 2019002011 A1 | 1/2019 |
| WO | 2019034376 A1 | 2/2019 |
| WO | 2019206624 A1 | 10/2019 |

OTHER PUBLICATIONS

Author Unknown; "Inspect & Maintain Elevators" Apps on Google Play; 4 Pages. https://play.google.com/store/apps/details?id=com.snappii_corp.elevator_inspection_app.

* cited by examiner

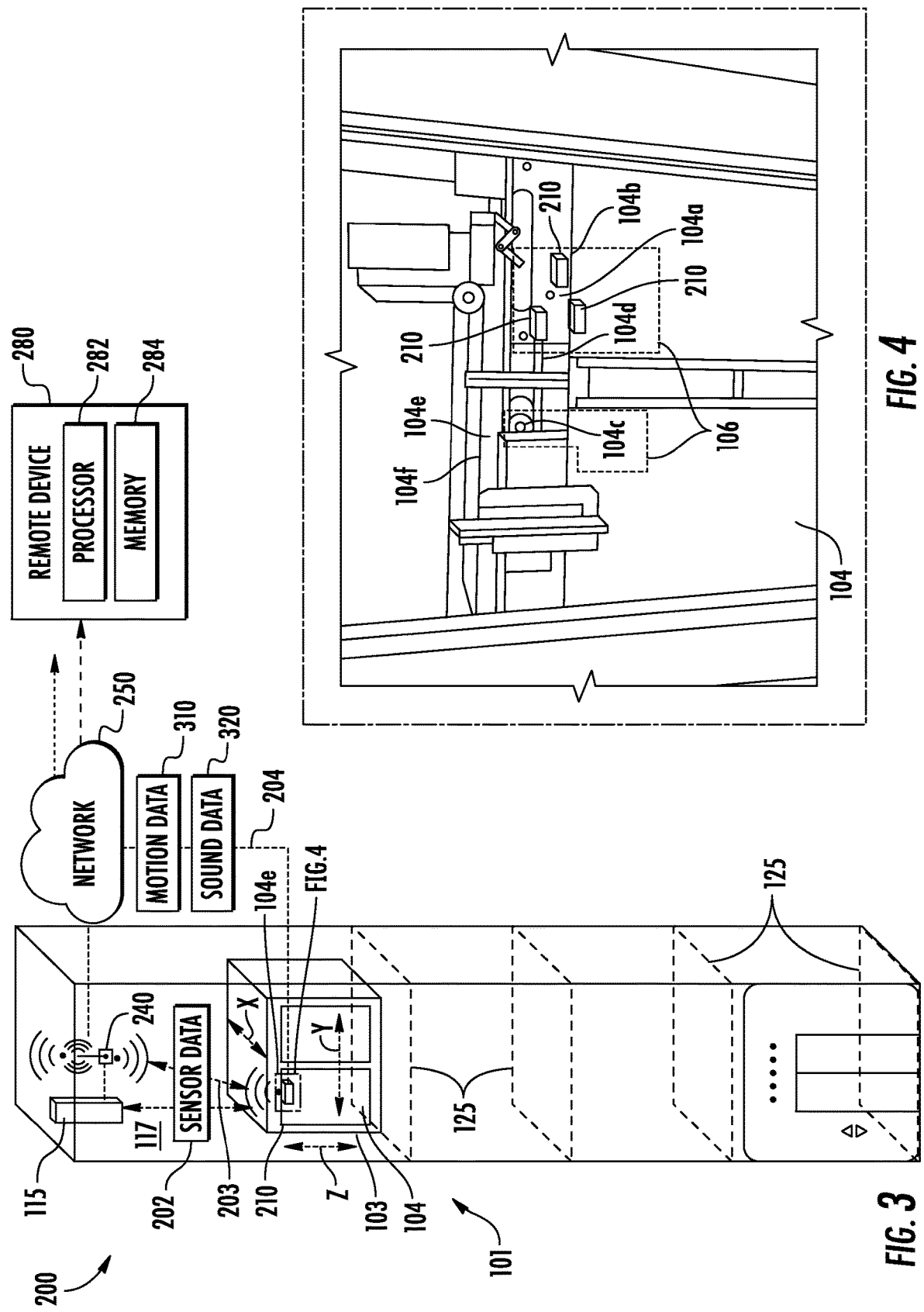

even number US 11,780,704 B2

MEASUREMENT AND DIAGNOSTIC OF ELEVATOR DOOR PERFORMANCE USING SOUND AND VIDEO

BACKGROUND

The subject matter disclosed herein relates generally to the field of conveyances systems, and specifically to a method and apparatus for monitoring operation of components of conveyance systems.

Monitoring operations of components of conveyance systems, such as, for example, elevator systems, escalator systems, and moving walkways may be difficult and/or costly.

BRIEF SUMMARY

According to an embodiment, a component monitoring system for monitoring a component of a conveyance system including a conveyance apparatus is provided. The component monitoring system including: a camera configured to capture a sequence images of the component, the sequence of images being motion data; and a processor configured to determine an evaluation summary of the component in response to at least the motion data.

In addition to one or more of the features described herein, or as an alternative, further embodiments may include a microphone configured to detect sound data of the component, wherein the evaluation summary is determined in response to the motion data and the sound data.

In addition to one or more of the features described herein, or as an alternative, further embodiments may include at least one of the camera and the microphone is located within a mobile computing device.

In addition to one or more of the features described herein, or as an alternative, further embodiments may include the conveyance system is an elevator system and the conveyance apparatus is an elevator car.

In addition to one or more of the features described herein, or as an alternative, further embodiments may include the component is an elevator door.

In addition to one or more of the features described herein, or as an alternative, further embodiments may include at least one of the camera and the microphone is located within the conveyance apparatus.

In addition to one or more of the features described herein, or as an alternative, further embodiments may include at least one of the camera and the microphone is located outside of the conveyance apparatus.

In addition to one or more of the features described herein, or as an alternative, further embodiments may include an abnormality is determined in the evaluation summary by linking the sound data with the motion data that occurred at a similar moment in time.

According to an embodiment, a method of monitoring a component of a conveyance system including a conveyance apparatus is provided. The method including: capturing a sequence images of the component using a camera, the sequence of images being motion data; and determining an evaluation summary of the component in response to at least the motion data.

In addition to one or more of the features described herein, or as an alternative, further embodiments may include: detecting sound data of the component using a microphone In addition to one or more of the features described herein, or as an alternative, further embodiments may include that the conveyance system is an elevator system and the conveyance apparatus is an elevator car.

In addition to one or more of the features described herein, or as an alternative, further embodiments may include that the component is an elevator door.

In addition to one or more of the features described herein, or as an alternative, further embodiments may include: determining an abnormality in the evaluation summary by linking the sound data with the motion data that occurred at a similar moment in time.

According to another embodiment, a component monitoring system for monitoring a component of a conveyance system including a conveyance apparatus is provided. The component monitoring system including: a device configured to detect motion data of the component; a microphone configured to sound data of the component; and a processor configured to determine an evaluation summary of the component in response to the motion data and the sound data.

In addition to one or more of the features described herein, or as an alternative, further embodiments may include that the device is a camera configured to capture images of the component, wherein the images are the motion data.

In addition to one or more of the features described herein, or as an alternative, further embodiments may include that at least one of the device and the microphone is located within a mobile computing device.

In addition to one or more of the features described herein, or as an alternative, further embodiments may include that the device is an inertial measurement unit sensor configured to detect accelerations, wherein the accelerations are the motion data.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the component is an elevator door.

In addition to one or more of the features described herein, or as an alternative, further embodiments may include that at least one of the camera and the microphone is located within the conveyance apparatus.

Technical effects of embodiments of the present disclosure include evaluating operation of a component through motion detection.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 3 is a schematic illustration of a component monitoring system with a sensing apparatus, in accordance with an embodiment of the disclosure;

FIG. 4 is a schematic illustration of the location of the sensing apparatus of FIG. 3, in accordance with an embodiment of the disclosure;

DETAILED DESCRIPTION

Figure 1:
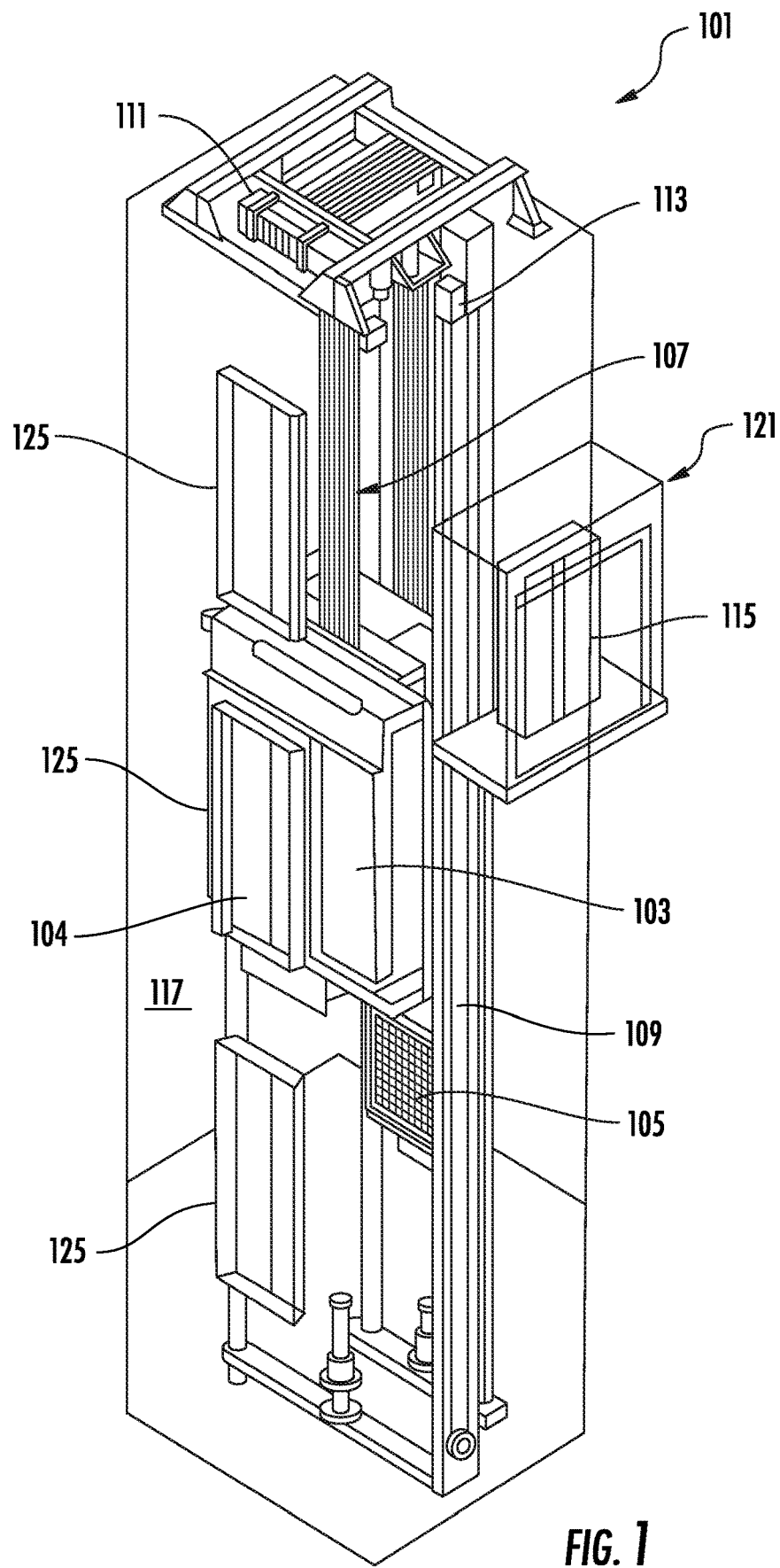
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103 or the elevator door 104 may be located on a landing 125 of the elevator system 101. Embodiments disclosed herein may be applicable to both an elevator door 104 integrally attached to the elevator car 103 or an elevator door 104 located on a landing 125 of the elevator system 101. The elevator door 104 opens to allow passengers to enter and exit the elevator car 103. Thus, the elevator door 104 makes an impression on the passenger of the elevator car 103 as being the first component of the elevator system 101 that the passenger may see as they enter the elevator car 103 and the last component of the elevator system 101 that the passenger may see when they leave the elevator car 103. Therefore, any unusual sound or movement made by the elevator door 104 may leave a strong impression on the passenger and the passenger may associate this impression of the elevator door 104 with the overall quality of the elevator system 101. The embodiments disclosed herein seek to provide an apparatus and a method that helps an elevator mechanic monitor and analyze performance the elevator door 104.

Figure 2:
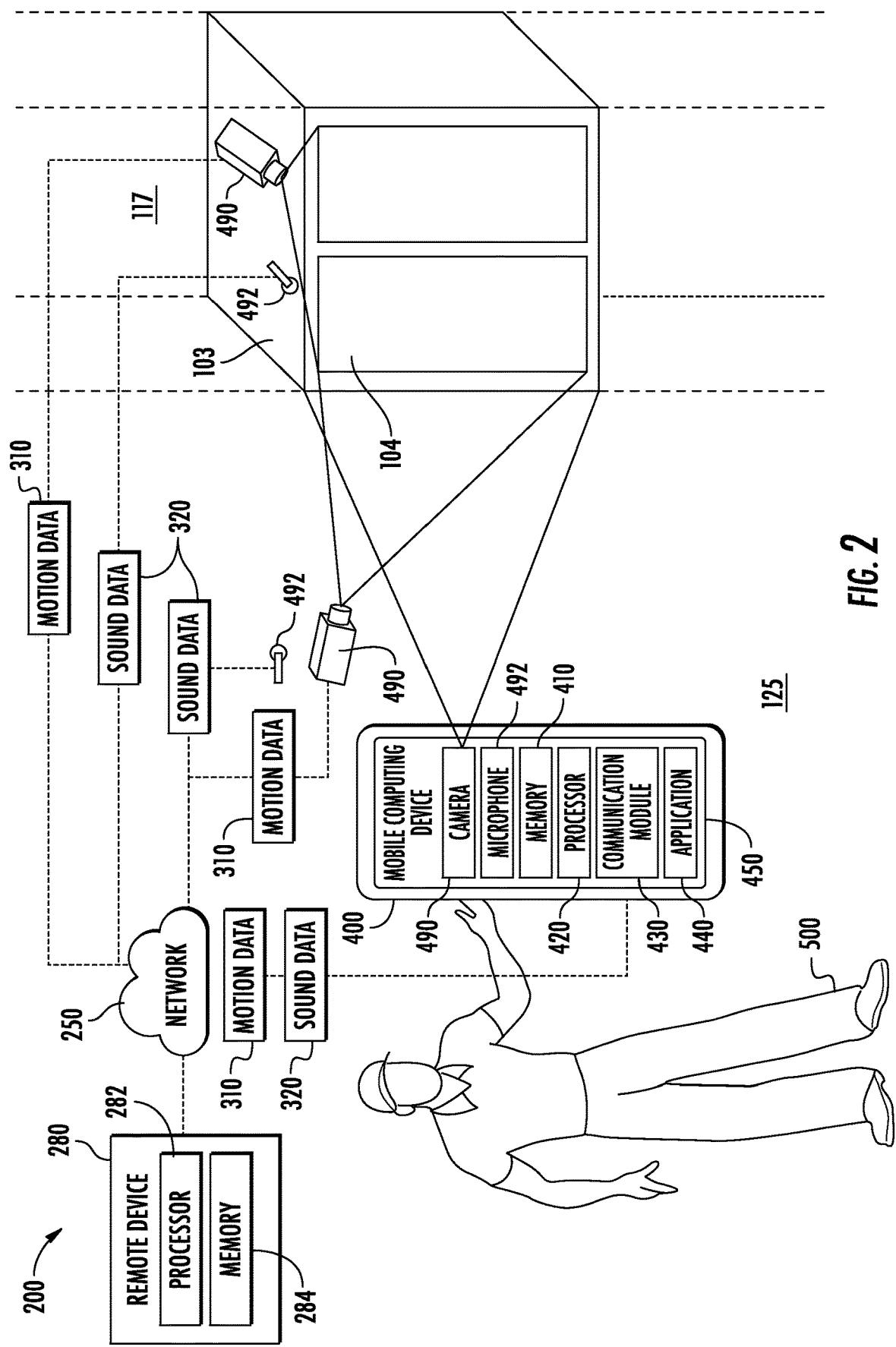
FIG. 2 is a schematic illustration of a component monitoring system, in accordance with an embodiment of the disclosure.

Referring now to FIG. 2 with continued reference to FIG. 1, a component monitoring system 200 is illustrated, in accordance with an embodiment of the present disclosure. It should be appreciated that, although particular systems are separately defined in the schematic block diagrams, each or any of the systems may be otherwise combined or separated via hardware and/or software. The component monitoring system 200 is configured to monitor and analyze the elevator door 104.

As illustrated in FIG. 2, the component monitoring system 200 may include a camera 490 and a microphone 492. The locations of the camera 490 and the microphone 492 may vary as indicated in FIG. 2. The camera 490 is configured to detect motion data 310 (e.g., a sequence of images) of the elevator door 104 and the microphone 492 is configured to capture sound data 320 (e.g., sound) emitted by the elevator door 104. The camera 490 is configured to capture a sequence of images and the motion data 310 may be the sequence of images captured by the camera 490. The component monitoring system 200 may include a camera 490 located in a mobile computing device 400, a camera 490 located within the elevator car 103, a camera 490 located outside of the elevator car 103, a microphone 492 located in the mobile computing device 400, a microphone 492 located within the elevator car 103, a microphone 492 located outside of the elevator car 103 or any combination thereof.

In one embodiment, the camera 490 may be located in the mobile computing device 400 and the microphone 492 may be located in the mobile computing device 400. In another embodiment, the camera 490 may be located in the mobile computing device 400 and the microphone 492 may be located within the elevator car 103. In another embodiment, the camera 490 may be located in the mobile computing device 400 and the microphone 492 may be located outside of the elevator car 103. In another embodiment, the camera 490 may be located outside of the elevator car 103 and the microphone 492 may be located within the elevator car 103. In another embodiment, the camera 490 may be located within the elevator car 103 and the microphone 492 may be located within the elevator car 103. In another embodiment, the camera 490 may be located outside of the elevator car 103 and the microphone 492 may be located outside of the elevator car 103.

In another embodiment, the camera 490 may be located outside of the elevator car 103 in an elevator lobby on a landing 125 and the microphone 492 may be located within the mobile computing device 400. In another embodiment, the camera 490 may be located within of the elevator car 103 and the microphone 492 may be located within the mobile computing device 400. In another embodiment, the camera 490 may be located within of the elevator car 103 and the microphone 492 may be located outside of the elevator car 103 in an elevator lobby on a landing 125.

A camera 490 located outside of the elevator car 103 may be configured to capture motion data 310 of the outside of the elevator door 104. A camera 490 located inside of the elevator car 103 may be configured to capture motion data 310 of the inside of the elevator door 104. A camera 490 located within a mobile computing device 400 may be configured to capture motion data 310 of the outside of the elevator door 104 and/or the inside of the elevator door 104 depending on where the individual 500 holding the mobile computing device 400 is located.

The mobile computing device 400 may belong to an individual 500, such as, for example, an elevator mechanic/technician working on the elevator system 101. The mobile computing device 400 may be a mobile computing device that is typically carried by a person, such as, for example a smart phone, cellular phone, PDA, smart watch, tablet, laptop, or similar device known to one of skill in the art. The mobile computing device 400 may include a display device 450 so that the mechanic may visually see motion data 310 (e.g., a sequence of image) that the camera 490 is capturing. The mobile computing device 400 may include a processor 420, memory 410, a communication module 430, and an application 440, as shown in FIG. 2.

The processor 420 can be any type or combination of computer processors, such as a microprocessor, microcontroller, digital signal processor, application specific integrated circuit, programmable logic device, and/or field programmable gate array. The memory 410 is an example of anon-transitory computer readable storage medium tangibly embodied in the mobile computing device 400 including executable instructions stored therein, for instance, as firmware. The communication module 430 may implement one or more communication protocols, such as, for example, short-range wireless protocols and long-range wireless protocols. The communication module 430 may be in communication with at least one of the network 250 and the remote device 280. In an embodiment, the communication module 430 may be in communication with the remote device 280 through the network 250 using at least one of short-range wireless protocols and long-range wireless protocols. Short-range wireless protocols 203 may include but are not limited to Bluetooth, Wi-Fi, HaLow (801.11ah), zWave, ZigBee, or Wireless M-Bus. Long-range wireless protocols 204 may include but are not limited to cellular, LTE (NB-IoT, CAT M1), LoRa, satellite, Ingenu, or SigFox.

The remote device 280 may be a computing device, such as, for example, a desktop, a cloud based computer, and/or a cloud based artificial intelligence (AI) computing system. The remote device 280 may also be a computing device that is typically carried by a person, such as, for example a smartphone, PDA, smartwatch, tablet, laptop, etc. The remote device 280 may also be two separate devices that are synced together, such as, for example, a cellular phone and a desktop computer synced over an internet connection.

The remote device 280 may be an electronic controller including a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The mobile computing device 400 may also include the camera 490 and the microphone 492. The communication module 430 of the mobile computing device 400 is configured to transmit the motion data 310 and/or the sound data 320 to the remote device 280 via short-range wireless protocols 203 and/or long-range wireless protocols 204. The communication module 430 may transmit the motion data 310 and/or the sound data 320 to the remote device 280 through the computing network 250. The network 250 may be a computing network, such as, for example, a cloud computing network, cellular network, or any other computing network known to one of skill in the art.

The mobile computing device 400 may be configured to process the motion data 310 and/or the sound data 320 using the processor 420 prior to transmitting to the remote device 280 through the communication module 430. This processing is known as edge processing and may be driven, directed, coordinated by the application 440 and use the processor 420. The application 440 may be computer software installed directly on the memory 410 of the mobile computing device 400 and/or installed remotely and accessible through the mobile computing device 400 (e.g., software as a service). Alternatively, the mobile computing device 400 may be configured to transmit as raw data (i.e., pre-processed data) the motion data 310 and/or the sound data 320 to the remote device 280 through the communication module 430. Then the remote device 280 may process the motion data 310 and/or the sound data 320.

The camera 490 located outside of the elevator car 103 (e.g., within the mobile computing device 400 or on the landing 125) may be configured to process the motion data 310 using a processor (not shown for simplicity) prior to transmitting to the remote device 280 through a communication module (not shown for simplicity). This processing is known as edge processing. Alternatively, the communication module (not shown for simplicity) of the camera 490 located outside the elevator car 103 may be configured to transmit as raw data (i.e., pre-processed data) the motion data 310 to the remote device 280 or to the mobile computing device 400, which may then transmit the raw data to the remote device 280 or process the raw data and then transmit the processed data to the remote device 280. Then the remote device 280 may process the motion data 310. The communication module (not shown for simplicity) of the camera 490 located outside of the elevator car 103 may be wirelessly connected to the remote device 280 through the computing network 250.

The microphone 492 located outside of the elevator car 103 (e.g., within the mobile computing device 400 or on the landing 125) may be configured to process the sound data 320 using a processor (not shown for simplicity) prior to transmitting to the remote device 280 through a communication module (not shown for simplicity). This processing is known as edge processing. Alternatively, the communication module (not shown for simplicity) of the microphone 492 located outside the elevator car 103 may be configured to transmit as raw data (i.e., pre-processed data) the sound data 320 to the remote device 280 or to the mobile computing device 400, which may then transmit the raw data to the remote device 280 or process the raw data and then transmit the processed data to the remote device 280. Then the remote device 280 may process the sound data 320. The communication module (not shown for simplicity) of the microphone 492 located outside of the elevator car 103 may be wirelessly connected to the remote device 280 through the computing network 250.

The camera 490 located within the elevator car 103 (e.g., within the mobile computing device 400 that is within the elevator car 103 or affixed within the elevator car 103) may be configured to process the motion data 310 using a processor (not shown for simplicity) prior to transmitting to the remote device 280 through a communication module (not shown for simplicity). This processing is known as edge processing. Alternatively, the communication module (not shown for simplicity) of the camera 490 located outside the elevator car 103 may be configured to transmit as raw data (i.e., pre-processed data) the motion data 310 to the remote device 280 or to the mobile computing device 400, which may then transmit the raw data to the remote device 280 or process the raw data and then transmit the processed data to the remote device 280. Then the remote device 280 may process the motion data 310. The communication module (not shown for simplicity) of the camera 490 located within the elevator car 103 may be wirelessly connected to the remote device 280 through the computing network 250.

The microphone 492 located within the elevator car 103 (e.g., within the mobile computing device 400 that is within the elevator car 103 or affixed within the elevator car 103) may be configured to process the sound data 320 using a processor (not shown for simplicity) prior to transmitting to the remote device 280 through a communication module (not shown for simplicity). This processing is known as edge processing. Alternatively, the communication module (not shown for simplicity) of the microphone 492 located outside the elevator car 103 may be configured to transmit as raw data (i.e., pre-processed data) the sound data 320 to the remote device 280 or to the mobile computing device 400, which may then transmit the raw data to the remote device 280 or process the raw data and then transmit the processed data to the remote device 280. Then the remote device 280 may process the sound data 320. The communication module (not shown for simplicity) of the microphone 492 located within the elevator car 103 may be wirelessly connected to the remote device 280 through the computing network 250.

The motion data 310 may be processed to determine an evaluation summary indicating performance of the elevator doors 104. The evaluation summary may indicate any abnormalities with the motion of the elevator doors 104. For example, the motion data 310 detected by the camera 490 may processed by comparing the motion data 310 detected by the camera 490 to baseline motion data to determine any abnormalities in the motion of the elevator doors 104. During the processing, the borders of the elevator door 104 may be monitored throughout the motion of the elevator door 104 to determine if there are any abnormalities in the motion (i.e., deviations from a baseline motion determined to be normal), such as, for example, bumps, jerkiness, vibrations, or any other motion that is not associated with normal operation of the elevator door 104.

The sound data 320 may be processed to determine an evaluation summary indicating performance of the elevator doors 104. The evaluation summary may indicate any abnormalities with the sound generated by the elevator door 104. For example, during the processing the sound data 320 detected by the microphone 492 may processed by comparing the sound data 320 detected by the microphone 492 to baseline sound data to determine any abnormalities in the sound generated by the elevator doors 104, such as, for example, bang, clangs screeches or any other sound that is not associated with normal operation of the elevator door 104.

The motion data 310 and the sound data 320 may be processed together to associate or link an abnormality determined in the sound data 320 with an abnormality determined in the motion data 310 that occurred at a similar moment in time. For example, a high pitch squeak may be associated with an unusual bump in the motion of the elevator car door 104.

The motion data 310 and the sound data 320 may be processed together to associate or link an abnormality determined in the sound data 320 with the current state of motion determined from the motion data 310. The current state of motion includes normal door motion as well as abnormal door motion. Normal door motion could include interaction with locking mechanisms, coupling or decoupling of the car door and the landing door, door motion (accelerating or decelerating), operation of the door motor, belts, and/or linkages.

Referring now to FIG. 3, with continued referenced to FIGS. 1-2, a view of a sensing apparatus 210 is illustrated, according to an embodiment of the present disclosure. The sensing apparatus 210 may be an alternate method to capture motion data 310 as opposed to the camera 490 illustrated in FIG. 2. The sensing apparatus 210 may also be used as a supplementary method to capture motion data 310 that is supplemental to the motion data 310 captured by to the camera 490 illustrated in FIG. 2.

The sensing apparatus 210 is configured to detect motion data 310 of the elevator car 103. The sensing apparatus 210 may also be configured to detect sound data 320. The sensing apparatus may be able to detect motion data 310 through vibratory signatures (i.e., vibrations over a period of time) or accelerations and derivatives or integrals of accelerations of the elevator car 103, such as, for example, distance, velocity, jerk, j ounce, snap . . . etc. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected.

In an embodiment, the sensing apparatus 210 is configured to transmit motion data 310 and/or the sound data 320 that is raw and unprocessed to a remote device 280 or mobile computing device 400 for processing. In yet another embodiment, the sensing apparatus 210 is configured to process the motion data 310 and/or the sound data 320 prior to transmitting to the remote device 280 through a processing method, such as, for example, edge processing.

The processing of the motion data 310 and/or the sound data 320 to determine an evaluation report may reveal data, such as, for example, abnormalities in elevator door 104 openings and closings, a number of elevator door openings/closings, a time length of elevator door openings/closings, a minimum time to open, a minimum time to close, vibrations, vibratory signatures, a number of elevator rides, elevator ride performance, probable car position (e.g. elevation, floor number), releveling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, etc.

The sensing apparatus 210 is configured to transmit the motion data 310 and/or the sound data 320 to the remote device 280 or the controller 115 via short-range wireless protocols 203 and/or long-range wireless protocols 204. Short-range wireless protocols 203 may include but are not limited to Bluetooth, BLE Wi-Fi, HaLow (801.11ah), zWave, ZigBee, or Wireless M-Bus. Using short-range wireless protocols 203, the sensing apparatus 210 is configured to transmit the motion data 310 and/or the sound data 320 directly to the controller 115 or to a local gateway device 240 and the local gateway device 240 is configured to transmit the motion data 310 and/or the sound data 320 to the remote device 280 through a network 250 or through the controller 115. The network 250 may be a computing network, such as, for example, a cloud computing network, cellular network, or any other computing network known to one of skill in the art. Using long-range wireless protocols 204, the sensing apparatus 210 is configured to transmit the motion data 310 and/or the sound data 320 to the remote device 280 through a network 250. Long-range wireless protocols 204 may include but are not limited to cellular, LTE (NB-IoT, CAT M1), LoRa, Satellite, Ingenu, or SigFox.

The sensing apparatus 210 may be configured to detect motion data 310 by detecting acceleration in any number of directions. In an embodiment, the sensing apparatus may detect the motion data 310 including acceleration data along three axis, an X axis, a Y axis, and a Z axis, as show in in FIG. 3. The X axis may be perpendicular to the door 104 of the elevator car 103, as shown in FIG. 3. The Y axis may be parallel to the door 104 of the elevator car 103, as shown in FIG. 3. The Z axis may be aligned vertically parallel with the elevator shaft 117 and pull of gravity, as shown in FIG. 3. The acceleration data may reveal vibratory signatures generated along the X-axis, the Y-axis, and the Z-axis.

FIG. 4 shows a possible installation location of the sensing apparatus 210 within the elevator system 101. The sensing apparatus 210 may include a magnet (not show) to removably attach to the elevator car 103. In the illustrated embodiment shown in FIG. 4, the sensing apparatus 210 may be installed on the door hanger 104a and/or the door 104 of the elevator system 101. It is understood that the sensing apparatus 210 may also be installed in other locations other than the door hanger 104a and the door 104 of the elevator system 101. It is also understood that the sensing apparatus 210 may be installed in other components of the elevator system 101. It is also understood that multiple sensing apparatus 210 are illustrated in FIG. 4 to show various locations of the sensing apparatus 210 and the embodiments disclosed herein may include one or more sensing apparatus 210. In another embodiment, the sensing apparatus 210 may be attached to a door header 104e of a door 104 of the elevator car 103. In another embodiment, the sensing apparatus 210 may be located on a door header 104e proximate a top portion 104f of the elevator car 103. In another embodiment, the sensing apparatus 210 is installed elsewhere on the elevator car 103, such as, for example, directly on the door 104.

As shown in FIG. 4, the sensing apparatus 201 may be located on the elevator car 103 in the selected areas 106. The doors 104 are operably connected to the door header 104e through a door hanger 104a located proximate a top portion 104b of the door 104. The door hanger 104a includes guide wheels 104c that allow the door 104 to slide open and close along a guide rail 104d on the door header 104e. Advantageously, the door hanger 104a is an easy to access area to attach the sensing apparatus 210 because the door hanger 104a is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104a also provides ample clearance for the sensing apparatus 210 during operation of the elevator car 103, such as, for example, door 104 opening and closing. Due to the mounting location of the sensing apparatus 210 on the door hanger 104a, the sensing apparatus 210 may detect open and close motions (i.e., acceleration) of the door 104 of the elevator car 103 and a door at the landing 125.

Figure 5:
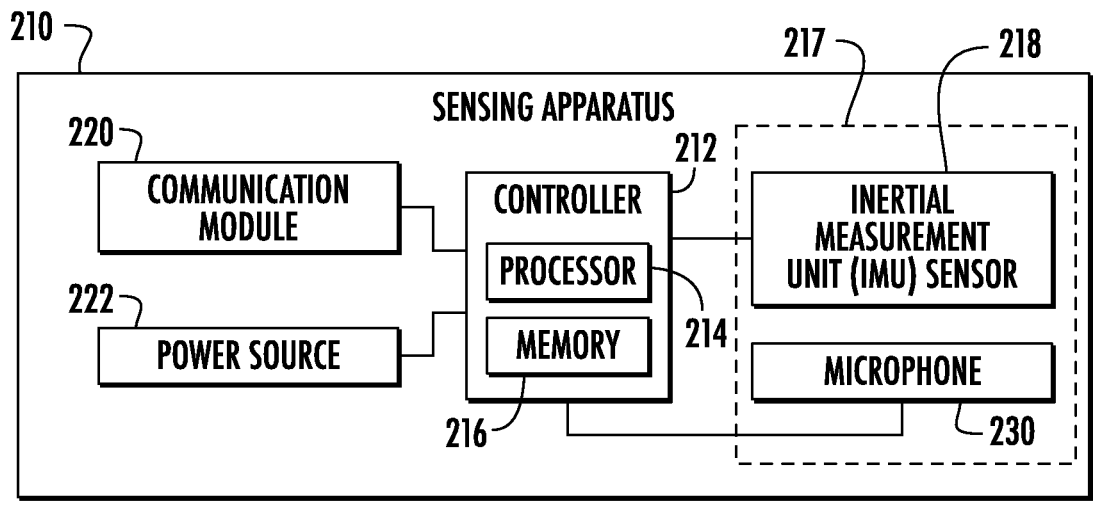
FIG. 5 is a schematic illustration of a sensing apparatus of FIG. 3, in accordance with an embodiment of the disclosure.

FIG. 5 illustrates a block diagram of the sensing apparatus 210 of the sensing system of FIGS. 3 and 4. It should be appreciated that, although particular systems are separately defined in the schematic block diagram of FIG. 5, each or any of the systems may be otherwise combined or separated via hardware and/or software. As shown in FIG. 5, the sensing apparatus 210 may include a controller 212, a plurality of sensors 217 in communication with the controller 212, a communication module 220 in communication with the controller 212, and a power source 222 electrically connected to the controller 212.

The plurality of sensors 217 includes an inertial measurement unit (IMU) sensor 218 configured to detect motion data 310 by detecting accelerations of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The accelerations detected by the IMU sensor 218 may include accelerations as well as derivatives or integrals of accelerations, such as, for example, velocity, jerk, jounce, snap . . . etc. The IMU sensor 218 is in communication with the controller 212 of the sensing apparatus 210. The plurality of sensors 217 may include a microphone 492 configured to detect sound data 320. The microphone 492 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, edge pre-processing or processing the motion data 310 collected by the IMU sensor 218 and/or the sound data 320 collected by the microphone 492. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art.

The sensing apparatus 210 includes a communication module 220 configured to allow the controller 212 of the sensing apparatus 210 to communicate with the remote device 280 and/or controller 115 through at least one of short-range wireless protocols 203 and long-range wireless protocols 204. The communication module 220 may be configured to communicate with the remote device 280 using short-range wireless protocols 203, such as, for example, Bluetooth, BLE, Wi-Fi, HaLow (801.11ah), Wireless M-Bus, zWave, ZigBee, or other short-range wireless protocol known to one of skill in the art. Using short-range wireless protocols 203, the communication module 220 is configured to transmit the motion data 310 and/or the sound data 320 to a local gateway device 240 and the local gateway device 240 is configured to transmit the motion data 310 and/or the sound data 320 to a remote device 280 or the mobile computing device 400 through a network 250, as described above. The communication module 220 may be configured to communicate with the remote device 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the motion data 310 and/or the sound data 320 to a remote device 280 through a network 250. In an embodiment, the short-range wireless protocol 203 is sub GHz Wireless M-Bus. In another embodiment, the long-range wireless protocol is SigFox. In another embodiment, the long-range wireless protocol is LTE NB-IoT or CAT M1 with 2G, 3G fallback.

Figure 6:
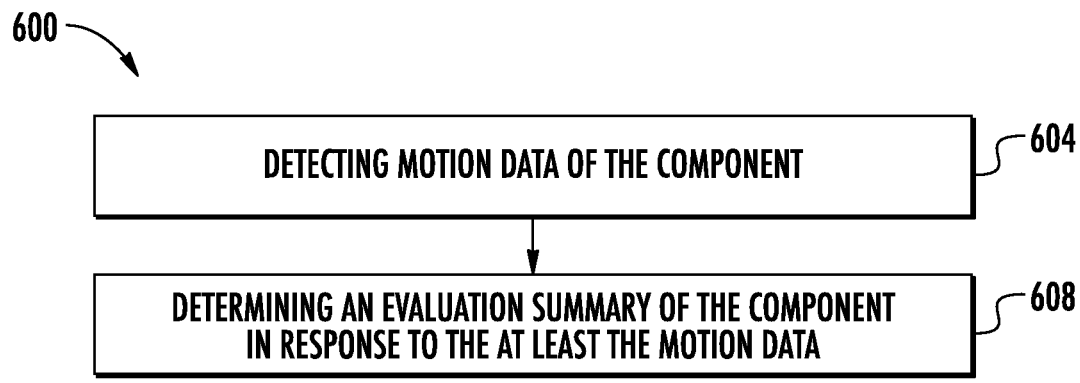
FIG. 6 is a flow chart of a method of monitoring a component of a conveyance system comprising a conveyance apparatus, in accordance with an embodiment of the disclosure.

Referring now to FIG. 6, with continued reference to FIGS. 1-4, a flow chart of method 600 of monitoring a component of a conveyance system comprising a conveyance apparatus is illustrated, in accordance with an embodiment of the disclosure. In an embodiment, the conveyance system is an elevator system 101 and the conveyance apparatus is an elevator car 103. In an embodiment, the component is an elevator door 104. In an embodiment, the method 600 may be performed by the component monitoring system 200 of FIGS. 2 and 3.

At block 604, motion data 310 of the component is detected. The motion data 310 may be detected by a camera 490 capturing a sequence of images of the component when it is operating (i.e., a door operating open/close events etc.,). The sequence of images are the motion data 310. The camera 490 may be located within a computing device 400. The motion data 310 may be detected by an IMU sensor 218 detecting acceleration of the component. The accelerations are the motion data 310.

At block 608, an evaluation summary of the component is determined in response to the motion data 310. The evaluation summary may indicate that the component is operating normally in accordance with baseline motion data. The evaluation summary may also indicate that the component is operating abnormally if the motion data 310 is different than baseline motion data. The method 600 may also comprise that sound data 320 of the component is detected using a microphone 492. The evaluation summary may also be determined in response to the motion data 310 and the sound data 320. The evaluation summary may also indicate that the component is operating abnormally if the sound data 320 is different than baseline sound data.

An abnormality in the component may be determined by linking the sound data 320 with the motion data 310 that occurred at a similar moment in time. For example, the motion data 310 may be used to evaluate a current state of door operation at the time of an abnormality detected in the sound data 320. For example, did the abnormality in the sound data 320 occur when the elevator doors 104 are engaging, when the elevator doors 104 are disengaging, during speed up of the elevator doors 104, or slow-down of the elevator doors 104. Then an abnormality in the component may be configured if an abnormality in the motion data 310 is confirmed to have occurred at the same time as the abnormality in the sound data.

While the above description has described the flow process of FIG. 6 in a particular order, it should be appreciated that unless otherwise specifically required in the attached claims that the ordering of the steps may be varied.

Figure 7:
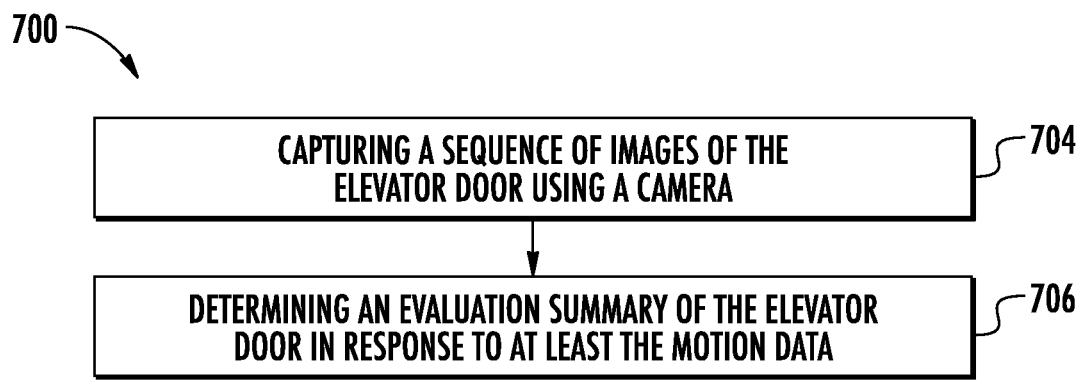
FIG. 7 is a flow chart of a method of monitoring an elevator door of the elevator system comprising of FIG. 1, in accordance with an embodiment of the disclosure.

Referring now to FIG. 7, with continued reference to FIGS. 1-4, a flow chart of method 700 of monitoring an elevator door 104 of an elevator system 101 comprising an elevator car 103, in accordance with an embodiment of the disclosure. In an embodiment, the method 700 may be performed by the component monitoring system 200 of FIGS. 2 and 3.

At block 704, a sequence of images of the elevator door 104 are captured using a camera 490. The sequence of images are motion data 310. At block 706, an evaluation summary of the elevator door 104 is determined in response to at least the motion data 310. The evaluation summary may indicate that the elevator door 104 is operating normally in accordance with baseline motion data. The evaluation summary may also indicate that the elevator door 104 is operating abnormally if the motion data 310 is different than baseline motion data.

The method 700 may also comprise that sound data 320 of the component is detected using a microphone 492. The evaluation summary may also be determined in response to the motion data 310 and the sound data 320. The evaluation summary may also indicate that the component is operating abnormally if the sound data 320 is different than baseline sound data.

An abnormality in the component may be determined by linking the sound data 320 with the motion data 310 that occurred at a similar moment in time. For example, the motion data 310 may be used to evaluate a current state of door operation at the time of an abnormality detected in the sound data 320. For example, did the abnormality in the sound data 320 occur when the elevator doors 104 are engaging, when the elevator doors 104 are disengaging, during speed up of the elevator doors 104, or slow-down of the elevator doors 104. Then an abnormality in the component may be configured if an abnormality in the motion data 310 is confirmed to have occurred at the same time as the abnormality in the sound data.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component monitoring system for monitoring a component of a conveyance system comprising a conveyance apparatus, the component monitoring system comprising:
   a microphone configured to detect sound data of the component;
   a camera configured to capture a sequence images of the component, the sequence of images being motion data; and
   a processor configured to determine an evaluation summary of the component in response to at least the motion data;
   wherein an abnormality is determined in the evaluation summary by linking the sound data with the motion data that occurred at a similar moment in time.

2. The component monitoring system of claim 1, further comprising:
   wherein the evaluation summary is determined in response to the motion data and the sound data.

3. The component monitoring system of claim 2, wherein at least one of the camera and the microphone is located within a mobile computing device.

4. The component monitoring system of claim 1, wherein the conveyance system is an elevator system and the conveyance apparatus is an elevator car.

5. The component monitoring system of claim 4, wherein the component is an elevator door.

6. The component monitoring system of claim 1, wherein at least one of the camera and the microphone is located within the conveyance apparatus.

7. The component monitoring system of claim 1, wherein at least one of the camera and the microphone is located outside of the conveyance apparatus.

8. A method of monitoring a component of a conveyance system comprising a conveyance apparatus, the method comprising:
   detecting sound data of the component using a microphone;
   capturing a sequence images of the component using a camera, the sequence of images being motion data; and
   determining an evaluation summary of the component in response to at least the motion data;
   determining an abnormality in the evaluation summary by linking the sound data with the motion data that occurred at a similar moment in time.

9. The method of claim 8, wherein the conveyance system is an elevator system and the conveyance apparatus is an elevator car.

10. The method of claim 9, wherein the component is an elevator door.

11. A component monitoring system for monitoring a component of a conveyance system comprising a conveyance apparatus, the component monitoring system comprising:
- a device configured to detect motion data of the component;
- a microphone configured to sound data of the component; and
- a processor configured to determine an evaluation summary of the component in response to the motion data and the sound data;
- wherein an abnormality is determined in the evaluation summary by linking the sound data with the motion data that occurred at a similar moment in time.

12. The component monitoring system of claim 11, wherein the device is a camera configured to capture images of the component, wherein the images are the motion data.

13. The component monitoring system of claim 12, wherein at least one of the device and the microphone is located within a mobile computing device.

14. The component monitoring system of claim 12, wherein the device is an inertial measurement unit sensor configured to detect accelerations, wherein the accelerations are the motion data.

15. The component monitoring system of claim 12, wherein the conveyance system is an elevator system and the conveyance apparatus is an elevator car.

16. The component monitoring system of claim 15, wherein the component is an elevator door.

17. The component monitoring system of claim 11, wherein at least one of the camera and the microphone is located within the conveyance apparatus.

* * * * *